July 4, 1939.   A. L. ELLIS   2,164,647
POWER TRANSMISSION
Original Filed Sept. 27, 1935   9 Sheets-Sheet 5

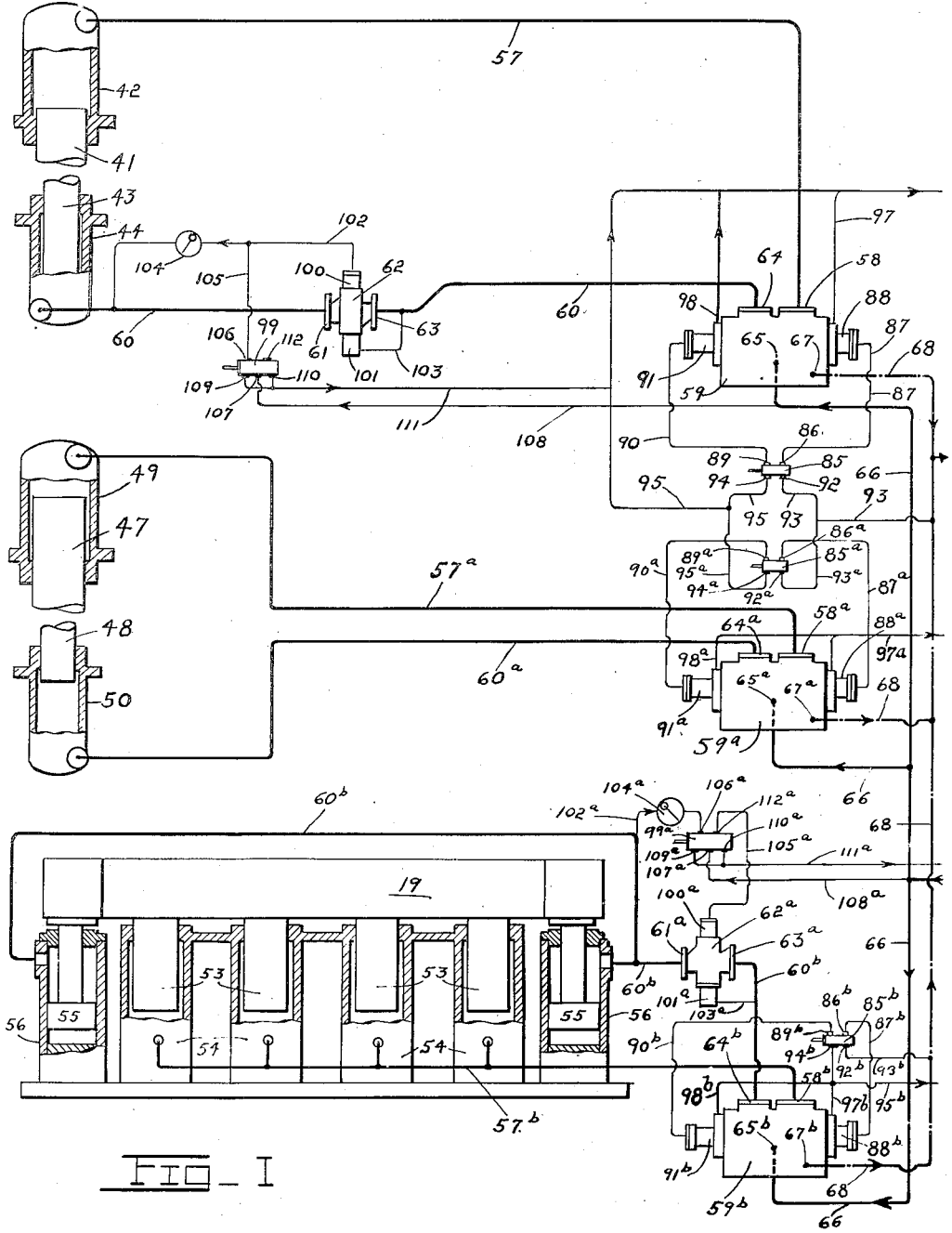

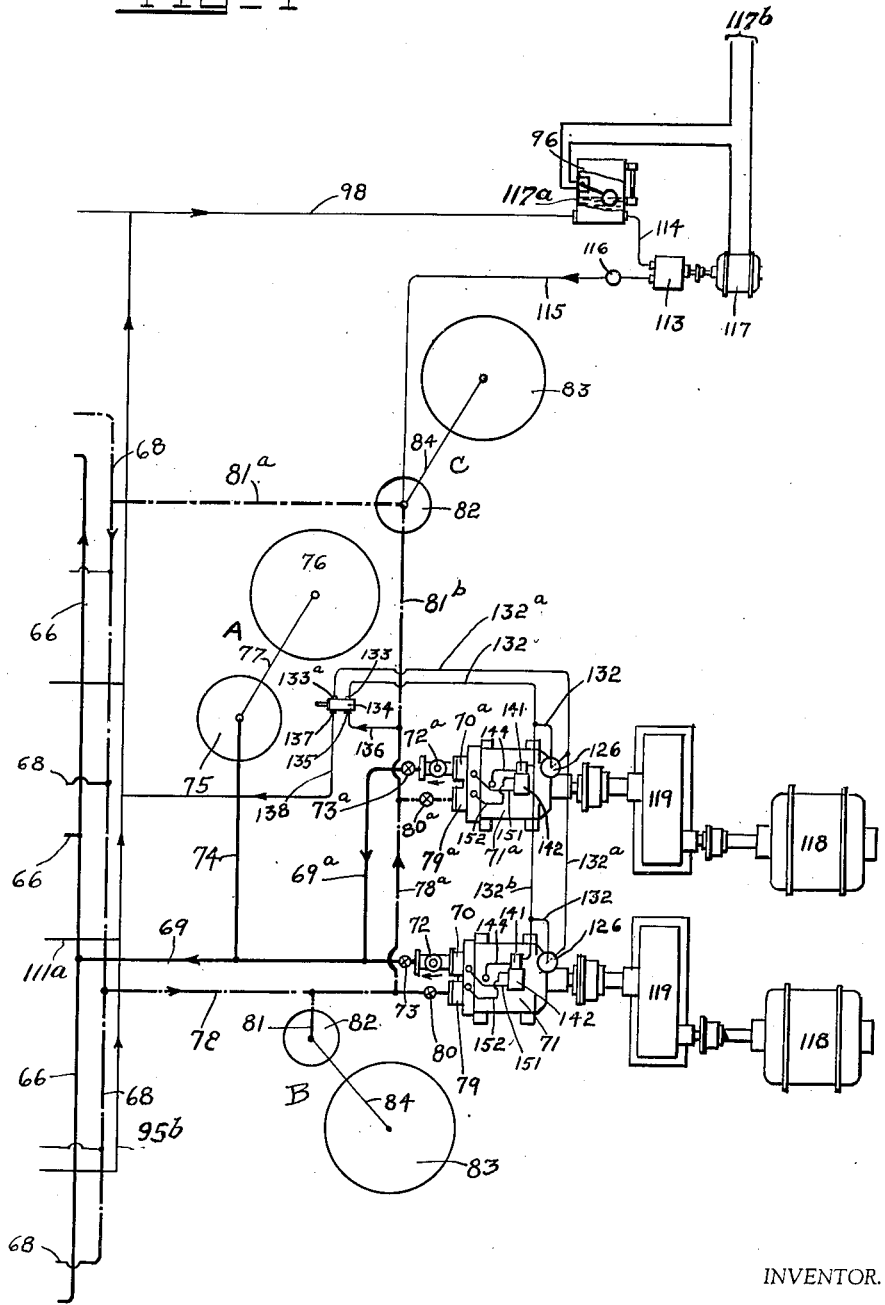

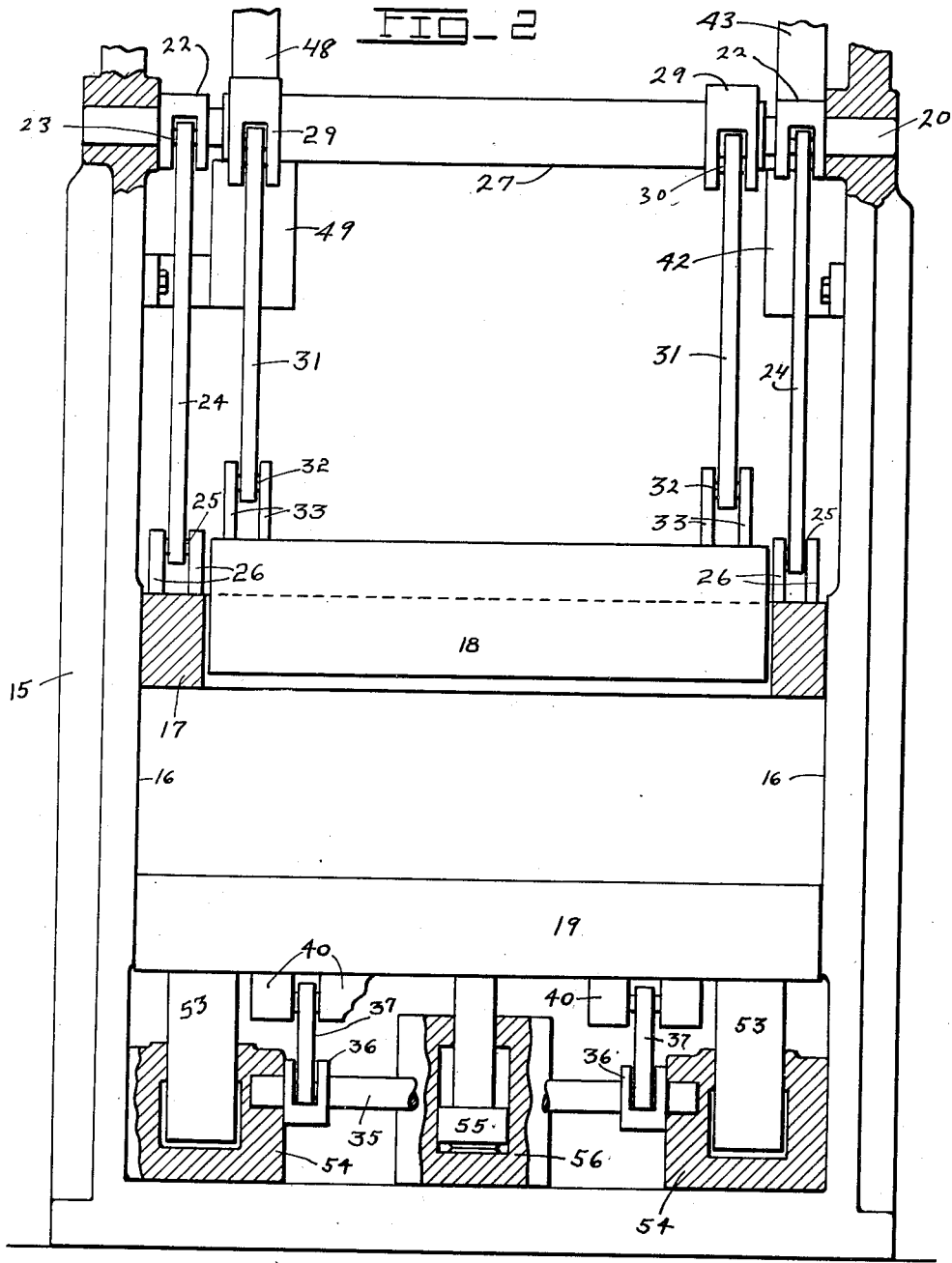

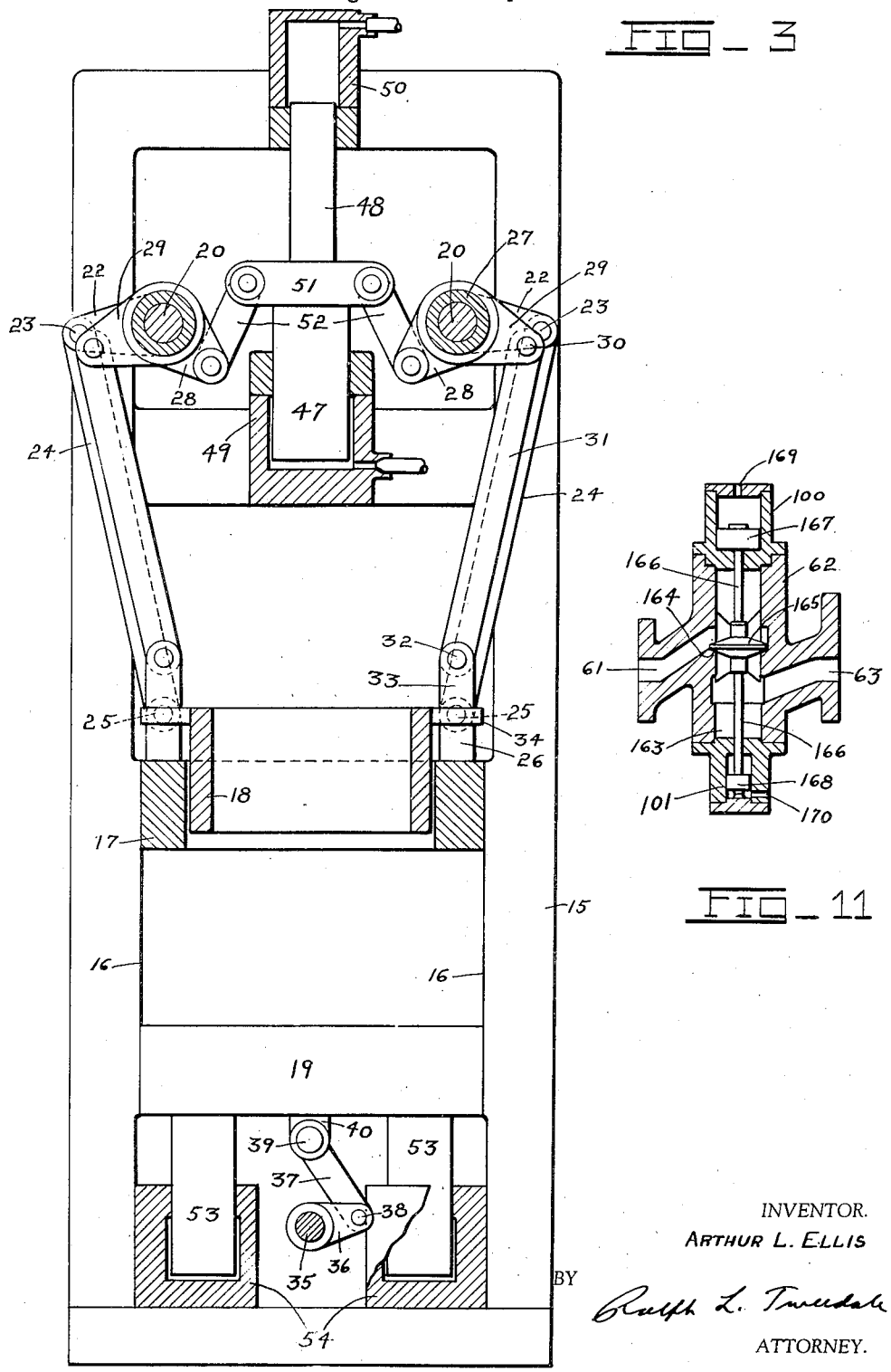

INVENTOR.
ARTHUR L. ELLIS
BY
Ralph L. Truesdale
ATTORNEY.

July 4, 1939.　　　A. L. ELLIS　　　2,164,647
POWER TRANSMISSION
Original Filed Sept. 27, 1935　　9 Sheets-Sheet 6

INVENTOR.
ARTHUR L. ELLIS
BY
Ralph L. Truesdale
ATTORNEY.

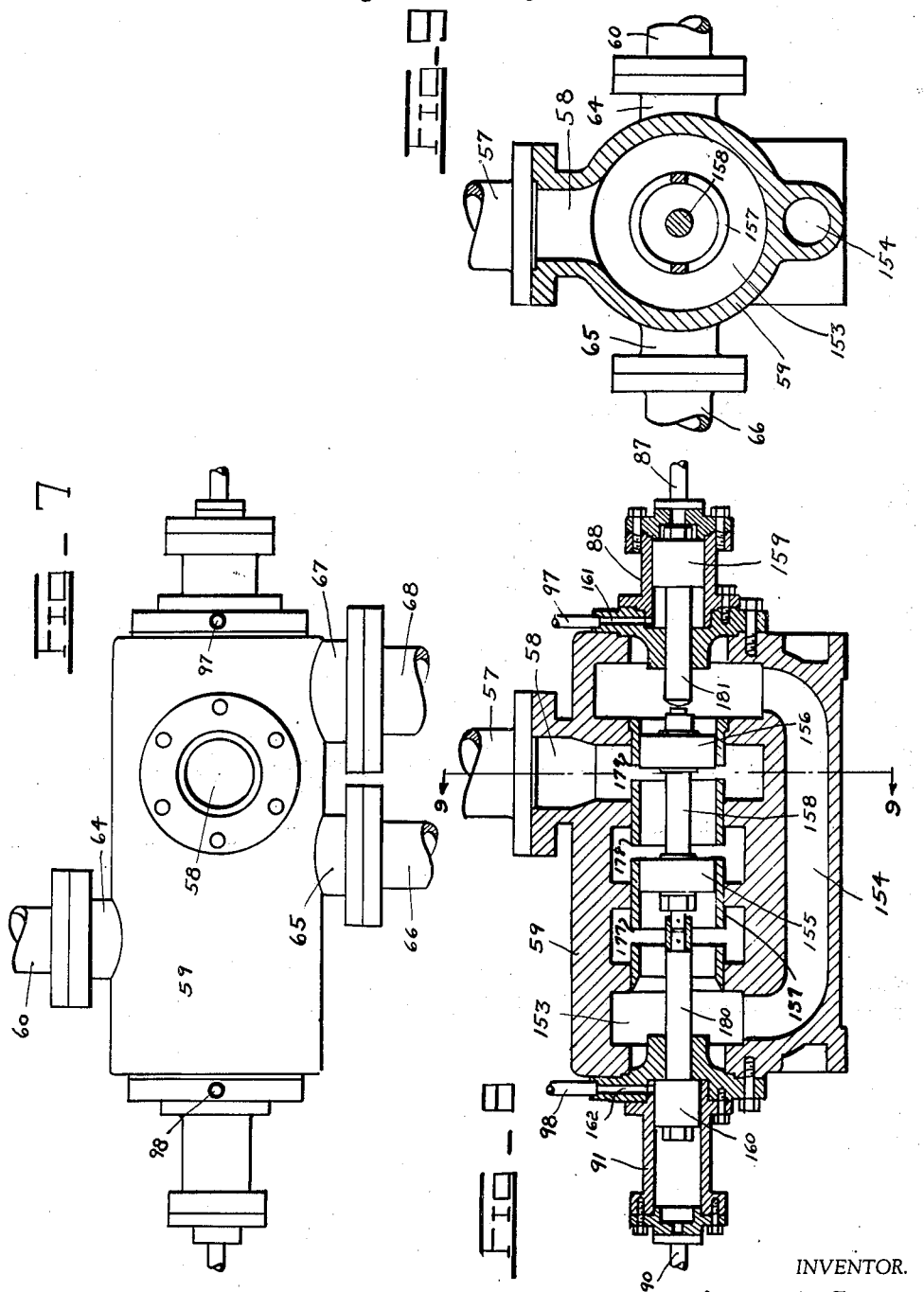

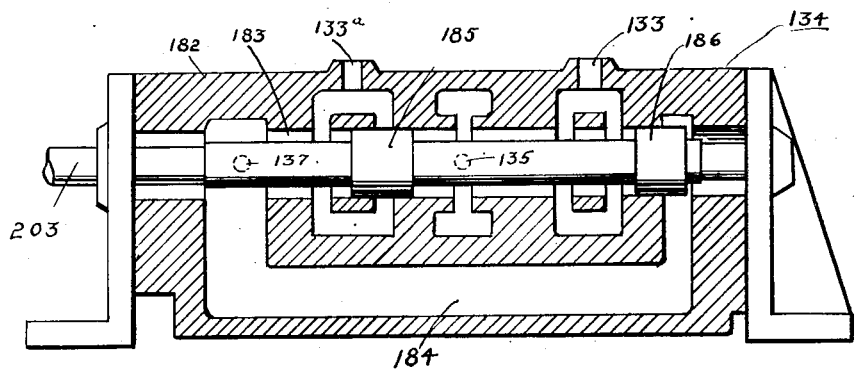
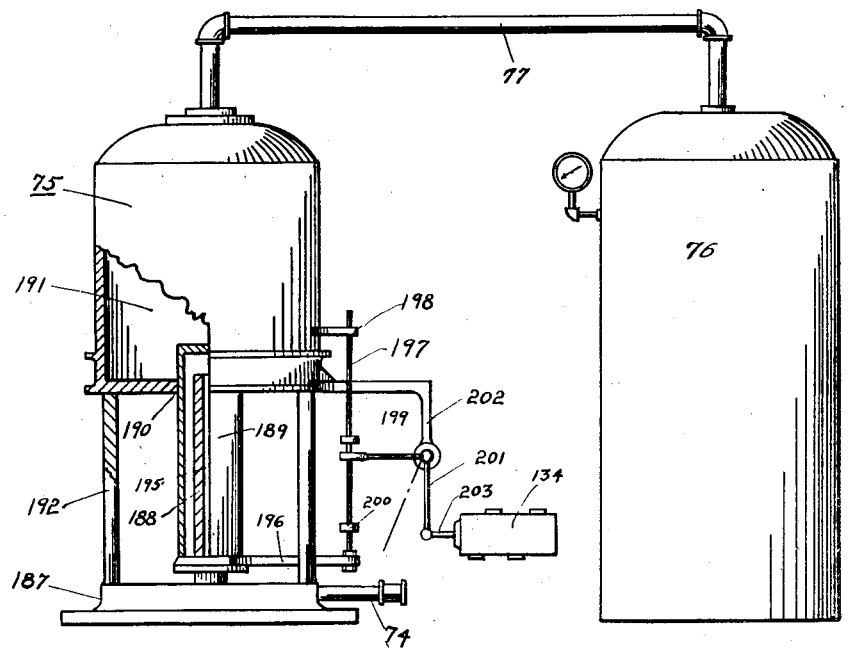

Patented July 4, 1939

2,164,647

UNITED STATES PATENT OFFICE 2,164,647

POWER TRANSMISSION

Arthur L. Ellis, Deep River, Conn., assignor to The Waterbury Tool Company, Waterbury, Conn., a corporation of Connecticut Application September 27, 1935, Serial No. 42,429
Renewed December 1, 1938

14 Claims. (Cl. 60—52)

This invention relates to power transmissions and more particularly hydraulic operating and control systems for systems of the indicated type designed for the operation and control of heavy duty machines such as presses adapted for the working of large sheets of metal utilized for instance in the construction of metal automobile bodies and the like. The invention contemplates primarily the provision of a novel hydraulic operating and control system or circuit for such machines whereby a maximum flexibility in the operation and control thereof is rendered possible and whereby the full tonnage or equivalent effect of the machine may be selectively exerted at any point in the operative cycle thereof.

Certain intricate and extremely large stampings require the use of not only a large capacity press but one which has a plurality of separately movable reciprocating slides for accomplishing a plurality of stamping operations at one time in a single press. Where the maximum effort which the press must exert is of the order of a thousand tons and three or more independently movable slides must be used, the use of a mechanically operated press, that is, for example, one in which the slides are reciprocated by one or more crankshafts and toggle and connecting rod linkages, entails many disadvantages. Due to the large investment in a press of so large a size, it is extremely desirable that the press be adaptable to many different types of press operations and exhibit a high degree of flexibility in the operating cycles thereof, so that it will not be rendered obsolete before the end of its useful life by change in the design of the stampings which are produced by the press. This flexibility is difficult to achieve in a mechanically operated press due to the limitations imposed by a mechanical linkage of any sort. With a mechanical press the operating cycle of each slide is to quite an extent invariable and therefore seriously restrictive to the usefulness of a mechanical press for manufacture of a wide variety of articles.

While it has long been known that hydraulic presses offered several advantages over mechanical presses in the way of flexibility of adjustment to meet various operating requirements and in increased die life, the high cost of the necessary fluid pumps and valves, particularly for the extremely large presses, has been disadvantageous.

It is an object of the present invention, therefore, to overcome these disadvantages and provide a hydraulic operating and control system for a large, multiple action, hydraulic press by which a high degree of flexibility in the operating cycle of the press may be secured at reasonable cost. It is also an object to provide a hydraulic operating means for a multiple action press of large size which will provide sufficient power for a maximum instantaneous load on the press while permitting the use of a hydraulic pump smaller than would ordinarily be required to accommodate the maximum instantaneous load.

A further object of the invention is to arrange the hydraulic system or circuit in a manner to enable different parts of the machine to be independently operated at will and to enable any one section or any combination of sections thereof to be efficiently operated and controlled in predetermined relationship.

Further objects and advantages of the present invention will be apparent from the following description, reference being had to the accompanying drawings wherein a preferred form of the present invention is clearly shown.

In the drawings:

Figures 1 and 1a are diagrammatic views which together illustrate the novel hydraulic system or circuit and control applied to a press;

Figure 2 is a fragmentary view exemplifying the press;

Figure 3 is a schematic sectional elevation thereof;

Figure 7 is a plan view of a reverse valve included in the circuit;

Figure 8 is a sectional elevation thereof;

Figure 9 is a cross-section on the line 9—9 of Figure 8;

Figure 11 is a detail sectional view of a check valve forming part of the circuit;

Figure 12 is a detail side view, partly in section, of a hydraulic accumulator forming part of the invention;

Figure 13 is a sectional view showing another pilot control valve used in the circuit;

For purposes of illustration and description the novel hydraulic operating and control system has been shown as applied to a press designed for heavy duty for which said system is specially adapted; it is however to be distinctly understood that such illustration and description is not intended to define the limits of utility of the novel system which, as will be apparent, may be efficiently applied to other types of machines.

Figure 4:
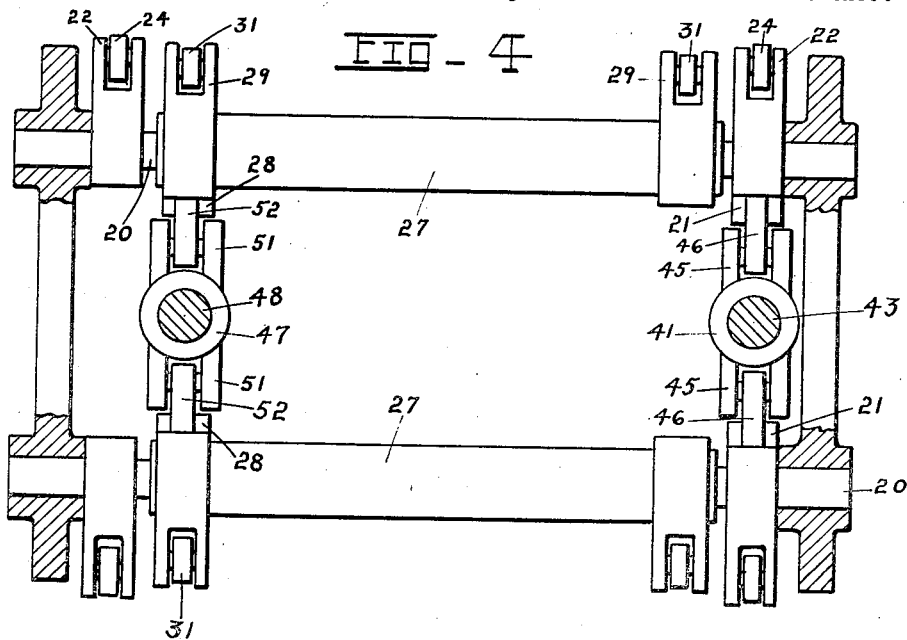
Figure 4 is a schematic horizontal section of the press.

The press which has been selected to exemplify the type of heavy duty machines for which the novel hydraulic system and control are specially adapted is diagrammatically illustrated in Figures 2, 3 and 4, and in such illustrated form consists of an upright frame 15 of conventional construction provided with guides 16 arranged in opposed parallel pairs and extending vertically of the frame 15 for guiding the first or main blank holder 17 in its vertical movements. The illustrated press further includes a second or auxiliary blank holder 18 adapted to move vertically within and relatively to the blank holder 17 which as shown, may be of open form to permit such operations. In addition the press shown in the drawings is provided with a press table 19 which is also movable in vertical directions lengthwise of the guides 16 as indicated in Figures 2 and 3. The means for operating the blank holder 17 as shown in the drawings consists of two shafts 20 suitably journalled on the frame 15 in spaced parallel relation and provided with arms 21 which project radially inward from and are fixed upon said shaft 20. Similar arms 22 are secured upon said shafts 20 in outwardly extending radial relation thereto and are pivotally connected at 23 with links 24 which themselves are pivotally connected at 25 to lugs 26 projecting upwardly from the main blank holder 17. As shown in Figure 3 tubular sleeves 27 are rotatably mounted upon the shafts 20 and are provided with inwardly directed arms 28 (Figure 4) and with outwardly directed arms 29. The latter are pivotally connected at 30 with links 31 which in turn are pivotally connected at 32 with lugs 33 extending upwardly from projections 34 carried by the second or auxiliary blank holder 18 as illustrated in Figures 2 and 3. For the purpose of assisting in maintaining the press table 19 properly lined up, a toggle arrangement may be provided, said arrangement comprising a shaft 35 suitably journalled in the machine and carrying one or more arms 36 as shown in Figures 2 and 3. The toggle arrangement further consists of links 37 each pivoted at 38 to an arm 36 and at 39 to lugs 40 depending from the press table 19.

The rocking of the shafts 20 to manipulate the arms 22, links 24 and associated elements in a manner to effect the desired operation of the first or main blank holder 17, is accomplished by means of a pressure ram or plunger 41 slidable in a pressure cylinder 42, and a return piston 43 reciprocable in a return cylinder 44. In practice the pressure ram 41 and the return piston 43 preferably comprise parts of a hydraulically operated unit which carries a coupling means illustrated in the form of oppositely extending members 45; the latter are pivotally connected with links 46 which in turn are pivotally connected with the previously mentioned arms 21. The means for rocking the tubular sleeves 27 to develop the desired operation of the second or auxiliary blank holder 18 likewise consists of a pressure ram or plunger 47 and a cooperating return piston 48 slidable respectively in a pressure cylinder 49 and return cylinder 50 as shown in Figure 3. The unit consisting of the combined ram 47 and piston 48 also carries a coupling means shown in the form of oppositely directed members 51 pivotally connected with links 52 which in turn are pivotally connected with the previously mentioned arms 28 as illustrated in Figure 3. For simplicity in the circuit diagram the units 41—43 and 47—48 are shown inverted in Fig. 1.

The press table 19 is supported upon a plurality of pressure rams or plungers 53 reciprocable in pressure cylinders 54 and further is provided with a plurality of return pistons 55 slidable in return cylinders 56 as shown in Figures 2 and 3.

As shown diagrammatically in Figure 1 a pipe line 57 leads from the pressure cylinder 42 to the port 58 of a hydraulically operated four-way reversing valve 59, the details of which, as illustrated in Figures 7, 8 and 9, will be more fully set forth hereinafter. A similar pipe line 60 extends from the return cylinder 44 to the port 61 of a hydraulically operated check valve 62, and continues from a second port 63 of said check valve 62 to a port 64 of the reversing valve 59; the check valve 62 is shown in detail in Figure 11 and will be more fully described hereinafter.

The pressure cylinder 49 is connected by means of a pipe line 57a with the port 58a of a second hydraulically operated four-way reversing valve 59a similar in construction and operation to the valve 59, while the return cylinder 50 is connected by means of a pipe line 60a with the port 64a of the reversing valve 59a as diagrammatically illustrated in Figure 1.

By means of pipe line 57b and branch pipes leading therefrom, the pressure cylinders 54 are connected with the port 58b of a third hydraulically operated four-way reversing valve 59b which also corresponds in construction and operation to the valve 59. The return cylinders 56 in turn are connected through the medium of a pipe line 60b with the port 61a of a second hydraulically operated check valve 62a, said pipe line 60b continuing from a second port 63a of said check valve 62a to the port 64b of the reversing valve 59b; the check valve 62a may be similar in construction and operation to the check valve 62 which, as previously stated herein, will be described in detail hereinafter.

The reversing valves 59, 59a and 59b are provided with high pressure ports 65, 65a and 65b respectively which are connected with each other by a pipe line 66, and further include low pressure ports 67, 67a and 67b respectively which are connected with each other by a pipe line 68 as diagrammatically illustrated in Figure 1.

The high pressure line 66 is connected by means of a pipe line 69 and a branch pipe 69a with the corresponding ports 70 and 70a respectively of two hydraulic variable delivery pumps 71 and 71a as shown in Figure 1a. In the preferred arrangement suitable check valves 72 and 72a are located in the pipe line 69 and branch pipe 69a respectively in proximity to the ports 70 and 70a to prevent back pressure through the latter. An example of the check valves 72 and 72a is shown in detail in Figure 6. For purposes of control the pipe line 69 and branch pipe 69a may each be provided with suitable shut-off valves 73 and 73a respectively, as indicated in Figure 1a. The pumps 71 and 71a may be duplicates of each other in construction and operation and are illustrated on an enlarged scale, with their associated elements, in Figures 5 and 6. These pumps will be referred to more fully hereinafter. As diagrammatically illustrated in Figure 1a, a branch pipe 47 leads from the pipe line 69 to the oil or equivalent cylinder 75 of a high pressure accumulator system A, which may be of any suitable type and as shown, is of the air operated type including a compressed air tank 76 connected with the accumulator proper 75 by means of a pipe 77. The construction of the accumulator system A is illustrated in Figure 12 and will be later described. It is capable of accumulating and releasing hydraulic energy.

The low pressure line 68 is connected by means of a pipe line 78 and branch pipe 78a with the second ports 79 and 79a respectively of the two pumps 71 and 71a as indicated in Figure 1a. For purposes of control the pipe line 78 and branch pipe 78a may each be provided with shut-off valves 80 and 80a respectively. A branch pipe 81 connects the pipe line 78 with a low pressure accumulator B while another branch pipe 81a leads from the pipe line 68 to a second low pressure accumulator C which is also connected with the branch pipe 78a by means of a branch connection 81b. The low pressure accumulators B and C may also be of any conventional type and as shown are of the same general type as accumulator A including the accumulators proper 82 connected with cooperating compressed air tanks 83 by pipes 84.

Figure 10:
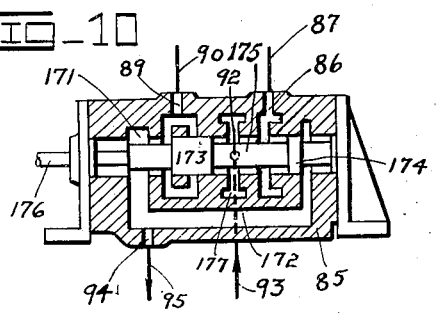
Figure 10 is a detail section illustrating a pilot control valve such as is used in the circuit.

The operation of the reversing valves 59, 59a and 59b is effected and controlled in the desired manner by means of pilot or control valves 85, 85a and 85b respectively, in a manner to be more particularly pointed out further on in the description; an example of such pilot or control valves being shown in detail in Figure 10. In the illustrated example the pilot or control valve 85 has a port 86 connected by means of a pipe 87 with a cylinder 88 forming part of and projecting from one end of the reversing valve 59, and further is provided with another port 89 which is connected by means of a pipe 90 with a second cylinder 91 forming part of and projecting from the opposite end of the reversing valve 59 as shown in Figure 1. In addition the pilot valve 85 includes a port 92 which is connected by means of a pipe 93 with the low pressure line 68, and another port 94 from which pipes 95, 97 and 98 lead to an oil tank 96 shown in Figure 1a.

The pilot or control valve 85a likewise has a port 86a connected by means of a pipe 87a with a cylinder 88a at one end of the reversing valve 59a, and a port 89a from which a pipe 90a leads to a cylinder 91a at the opposite end of said reversing valve 59a. A port 92a of the pilot valve 85a communicates with a pipe 93a which in turn is connected with the low pressure line 68 for instance through the medium of the pipe 93, while another port 94a of said pilot valve 85a is connected by means of a branch connection 95a with the pipe 95 which leads back to the oil tank 96.

Similarly the pilot or control valve 85b is provided with a port 86b from which a pipe 87b extends to the cylinder 88b at one end of the reversing valve 59b, and a second port 89b which is connected by means of a pipe 90b with the cylinder 91b located at the opposite end of the reversing valve 59b. A third port 92b of the pilot valve 85b is connected by means of a pipe 93b with the low pressure line 68, and a fourth port 94b thereof communicates with a pipe 95b which leads back to the tank 96.

The cylinders 88, 91 and 88a, 91a, and 88b and 91b of the respective reversing valves 59, 59a and 59b are connected with the tank 96 by means of pipes 97, 98, 97a, 98a, 97b and 98b, respectively as indicated diagrammatically in Figure 1.

Figure 15:
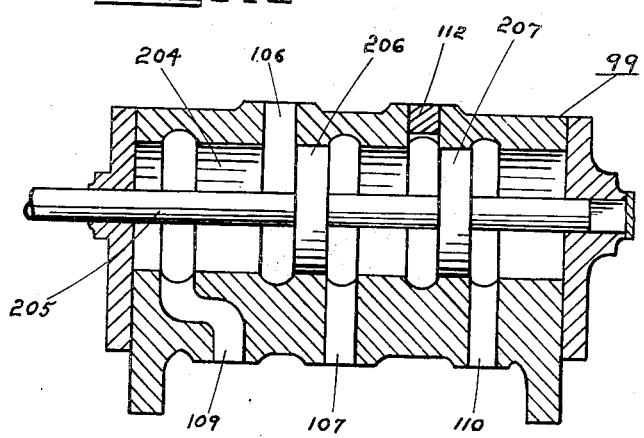
Figure 15 is a sectional view showing another pilot control valve used in the circuit.

Corresponding pilot or control valves 99 and 99a are provided for respectively controlling the operation of the hydraulically operated check valves 62 and 62a. An example of these valves is illustrated in Figure 15 later to be described in detail. As shown diagrammatically in Figure 1 the check valve 62 is provided at its opposite ends with cylinders 100 and 101 respectively, the cylinder 100 being connected by means of a pipe 102 with the previously mentioned pipe line 60 to one side of the check valve 62, while the other cylinder 101 is connected by means of a pipe 103 with said pipe line 60 on the other side of said check valve 62. In the preferred arrangement, a conventional check valve 104 is located in the pipe 102 as indicated in Figure 1. A connecting pipe 105 leads from the pipe 102 to a port 106 of the pilot valve 99 which has a second port 107 connected by means of a pipe 108 with the high pressure line 66. In addition, the pilot valve 99 has two further ports 109 and 110 which are connected with the previously mentioned tank 96 by a branch pipe 111 as indicated in Figure 1. A port 112 of valve 99 is plugged.

The check valve 62a likewise includes two cylinders 100a and 101a located respectively at its opposite ends, the cylinder 100a being connected by means of a pipe 105a with a port 112a of the pilot valve 99a, while a pipe 103a leads from the other cylinder 101a to the previously mentioned pipe line 60b on one side of the hydraulically operated check valve 62a. As diagrammatically illustrated in Figure 1 a pipe 102a leads from a second port 106a of the pilot valve 99a to said pipe line 60b on the other side of said check valve 62a. The third port 107a of the pilot valve 99a leads to the high pressure line 66 through a pipe 108a. The pipe 102a is provided with a conventional check valve 104a of any customary type. Two additional ports 109a and 110a of the pilot valve 99a are connected by means of a branch pipe 111a with the previously mentioned tank 96.

The pilot valves 85, 85a and 85b are selectively operated by means of any suitable control operating system, a preferred system being shown in Figure 14 to be described later.

The system further includes an auxiliary pump 113 of suitable type for returning leakage oil from the tank 96 to the low pressure line, said pump 113 accordingly being connected with said tank 96 by a pipe 114 and with the oil cylinder 82 of the low pressure accumulator C by means of a pipe 115 in which a check valve 116 of conventional type is preferably located. The pump 113 is driven for instance by an electric motor 117 which preferably is automatically controlled by a float operated switch 117a located in the tank 96 and controlling the motor feed circuit 117b so as to start and stop the motor 117 in accordance with changes in the oil level in said tank 96.

The previously mentioned hydraulic variable delivery pumps 71 and 71a may be driven in any conventional manner as for instance by means of electric motors 118 operatively connected with said pumps preferably through the medium of suitable speed reduction gearing 119 as diagrammatically illustrated in Figure 1a.

Figure 5:
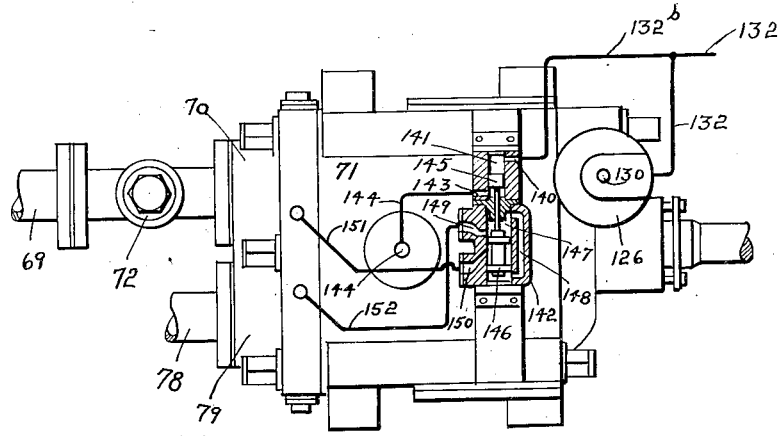
Figure 5 is a detail plan view of a hydraulic pump and its control with parts in section as used in the novel system or circuit.
Figure 6:
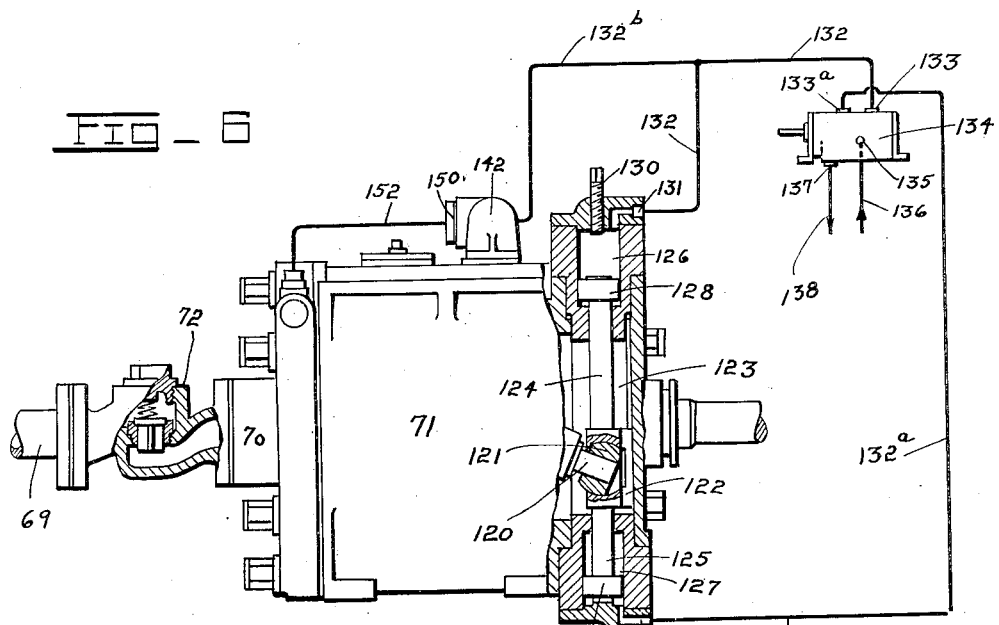
Figure 6 is an elevation of said pump partly in section.

The pumps 71 and 71a in the form shown in Figures 5 and 6 are of the well-known "Waterbury" type as shown for instance in United States Patent #1,659,374 of February 14, 1928, John Robson, and in which the control is effected through the medium of a so-called tilting box adjustable from a neutral position at right angles to the axis of the pump to various operative positions at inclinations thereto; in such pumps the setting of the tilting box determines the operative effect of the particular pump in question.

In the particular form of such pumps illustrated in Figures 5 and 6, the tilting box is provided with a stud 120 which extends into a bushing 121 mounted in a bearing 122 in which said bushing 121 is capable of rocking. The bearing 122 is vertically movable lengthwise of a guide 123 and is carried by piston rods 124 and 125 projecting in opposite directions from said bearing 122 into cylinders 126 and 127 located in spaced opposed relation on the casing of the particular pump; the piston rods 124 and 125 are provided with pistons 128 and 129 which are respectively reciprocable in the cylinders 126 and 127 as illustrated in Figure 6. A set screw 130 may be provided on one of the cylinders, as for instance the cylinder 126, to constitute an adjustable abutment for arresting the movements of the pistons 128 and 129 in one direction when the tilting box is in its neutral position and to prevent adjustment of said tilting box in this direction beyond said neutral position.

The cylinder 126 of each pump 71 and 71a is provided with a port 131 connected by means of a pipe 132 with a port 133 of a pilot or control valve 134 similar in type to the pilot or control valves previously maintained herein and to be described in more detail hereafter. Similarly the cylinder 127 includes a port 131a from which a pipe 132a leads to a second port 133a of said pilot valve 134 which in addition has a port 135 connected by means of a pipe 136 with the low pressure line for instance by leading to the branch connection 81b as shown in Figure 1a, and another port 137 connected by means of a pipe 138 with the previously mentioned tank 96. The pilot valve 134 as illustrated in Figures 1a and 6 is automatically actuated in accordance with the amount of fluid in the accumulator A as will appear more fully hereinafter.

As shown in Figures 1a, 5 and 6, the port 133 of the pilot valve 134 is in communication with a pipe 132b which leads to the port 140 of an operating cylinder 141 forming part of a hydraulically controlled by-pass valve 142 with which each of the pumps 71 and 71a is provided; each operating cylinder 141 is further provided with a second port 143 which is connected at 144 with the casing of the associated pump 71 or 71a as shown in Figure 5. A piston 145 is slidably mounted in the cylinder 141 and is connected with a slide valve 146 slidably mounted in the independent cylinder 147 of each by-pass valve 142, the opposite ends of said cylinder 147 being connected by means of a channel 148. Each by-pass valve 142 includes two ports 150 and 149 from which pipes 151 and 152 respectively lead to the associated pump casing so as to communicate respectively with the ports 70 and 79 of the pump 71 or with the corresponding ports 70a and 79a of the pump 71a as the case may be.

The construction of the reverse valves 59, 59a and 59b is illustrated in Figures 7, 8 and 9. The valve 59 which is shown therein may be taken as illustrative and comprises an interior chamber 153 having its opposite ends in communication through a passage 154 formed in the valve body. A pair of spaced piston valves 155 and 156 are slidably mounted within a guide spider 157 and mounted upon a rod 158 for movement in unison. The spider 157 is provided with slots 177, 178, and 179 which open into passages communicating with the valve ports 64, 65 and 58 respectively. The chamber 153 and the passage 154 are in communication with the valve port 67. The rod 158 is connected to a piston 160 through the medium of an extension 180 at the left hand end of the valve rod 158. At the right hand end of the rod 158 a push rod 181 which is attached to the piston 159 abuts the rod 158. The net area of the piston 159 is somewhat larger than the area of the piston 160, while the stroke of the piston 159 is but half the stroke of the piston 160. Due to the effect of fluid pressure on the exposed right hand end of the valve rod 158, the valve is normally unbalanced toward the extreme left hand position. The areas of the pistons 159 and 160 are so chosen with respect to the net effective area of the end of valve rod 158 that whenever cylinder 91 is cut off from the fluid pressure supply, the valves 155 and 156 move to the extreme left hand position thus connecting the port 64 with the port 65 and the port 58 with the port 67. Whenever fluid under pressure is admitted to both cylinder 91 and cylinder 88, the piston 159 moves to the left through its full stroke and due to its greater area is able to prevent movement of the piston 160 to the right beyond mid-stroke, thus connecting the port 67 with both ports 64 and 58. Whenever pressure is applied to cylinder 91 alone, the valve is moved to the position shown in Figure 8 to connect port 65 with port 58 and port 64 with port 67.

The structural details of the hydraulically operated check valves 62 and 62a, both of which are of similar type, are shown in Figure 11, which for descriptive purposes illustrates specifically the check valve 62. As the check valve 62a is of corresponding arrangement, the following explanation will answer for both:

The ports 61 and 63 of the valve 62 communicate with the inner chamber 163 thereof, said chamber 163 being provided with a valve seat 164 located between the ports 61 and 63 for cooperation with the valve 165 to control the communication between said ports 61 and 63. The valve 165 is carried by a rod 166 which projects in opposite directions from said valve 165 into connection with pistons 167 and 168 slidably mounted respectively in the cylinders 100 and 101. As shown in Figure 11 the piston 167 is preferably of greater cross-sectional area than the piston 168. The check valve 62 is further provided with a port 169 leading to the previously mentioned pipe 102 and a second port 170 communicating with the previously mentioned pipe 103, said ports 169 and 170 opening respectively into the cylinders 100 and 101.

An example of the various pilot or control valves, 85, 85a, etc., referred to hereinbefore is illustrated in detail in Figure 10, the pilot valve 85 having been selected for descriptive purposes. As shown the pilot valve 85 includes an interior chamber 171, the opposite ends of which are connected with each other by means of a channel 172, it being understood that the previously mentioned ports 86, 89 and 94, all communicate with said chamber 171, while the port 92 is in direct communication with a separate interior chamber 177 as indicated in Figure 10. A pair of valve pistons 173 and 174 are mounted in spaced relation upon a stem 175 and are slidably mounted in the chamber 171 in a manner to control the communication between the various ports, the valve 173 being of somewhat greater axial dimension than the valve 174 as shown in Figure 10. The stem 175 projects outwardly beyond one end of the pilot valve in the form of a reduced rod 176 which is suitably connected with an operating linkage whereby the valves 173 and 174 are selectively adjusted to alter the communication between the ports 86, 89, 92, and 94. Thus in the right hand position, which is illustrated in Figure 10, communication is established between ports 86 and 92 and between ports 89 and 94. When the valve is moved to the left one-half of its movement, the port 89 is cut off from communication with port 94 and placed in communication with port 92 while ports 86 and 92 remain in communication as in the first position. When the valves are moved their full stroke to the left, the ports 89 and 92 remain in communication but port 86 is transferred from communication with port 92 to communication with port 94 through passage 172.

Referring now to Figure 13, there is illustrated the construction of the valve 134 which comprises a valve body 182 being formed therein an interior bore 183, the opposite ends of which are in communication through a passage 184. Within the bore 183 there is slidably mounted a valve member comprising pistons 185 and 186. The ports 133, 133a, 135 and 137 communicate with the bore 183 in the manner illustrated so that whenever the valves 185 and 186 are moved to the right hand position, as shown, communication is established between the ports 137 and 133a and between the ports 135 and 133. When the valve is moved to the left hand position, the connection of the ports is reversed so that port 133 is placed in communication with port 137 through the passage 184, and port 135 is placed in communication with the port 133a.

The valve 134 is operated in accordance with the level of fluid in the accumulator A, the construction of which is diagrammatically illustrated in Figure 12. Thus the accumulator proper 75 may comprise a base 187 having centrally positioned thereon a hollow piston 188. Surrounding the piston 188 there is provided a vertically movable oil cylinder 189 within which the oil to be accumulated is stored. The upper end of the cylinder 189 reciprocates within a bore 190 formed in the bottom of an air chamber 191 which is supported from the base 187 by means of uprights 192. The air chamber 191 is in communication with the air storage reservoir 76 through a conduit 77, it being understood that suitable mechanism, not shown, may be provided for initially establishing and maintaining a suitable pressure upon the air within the reservoir 76 and the chamber 191. The conduit 74 extends through the base 187 to communicate with a passage 195 formed in the piston 188. In order to control the valve 134 a bracket 196 is secured to the bottom of the cylinder 189 and carries at its outer end a vertical rod 197 which is slidably mounted in a bracket 198. The rod 197 carries a pair of adjustable stops 199 and 200. A bell crank 201 is pivoted in a bracket 202 and has one arm thereof in juxtaposition to the rod 197 for actuation by the stops 199 and 200, while the other arm thereof is connected to actuate the operating rod 203 of the valve 134.

The construction of the valves 99 and 99a is illustrated in Figure 15. The valve 99, which may be taken as illustrative, is provided with an interior bore 204 within which is slidably mounted a valve member 205 carrying a pair of piston valves 206 and 207. The ports 106, 107, 109, 110 and 112 open directly to counterbores in the bore 204 in such positions that when the valve is in the right hand position, as illustrated, the port 106 is in communication with port 109, while the port 112 is in communication with the port 107. When the valve is moved to the left, the connections are in effect reversed and port 106 is placed in communication with port 107 while port 112 is placed in communication with port 110.

Figure 14:
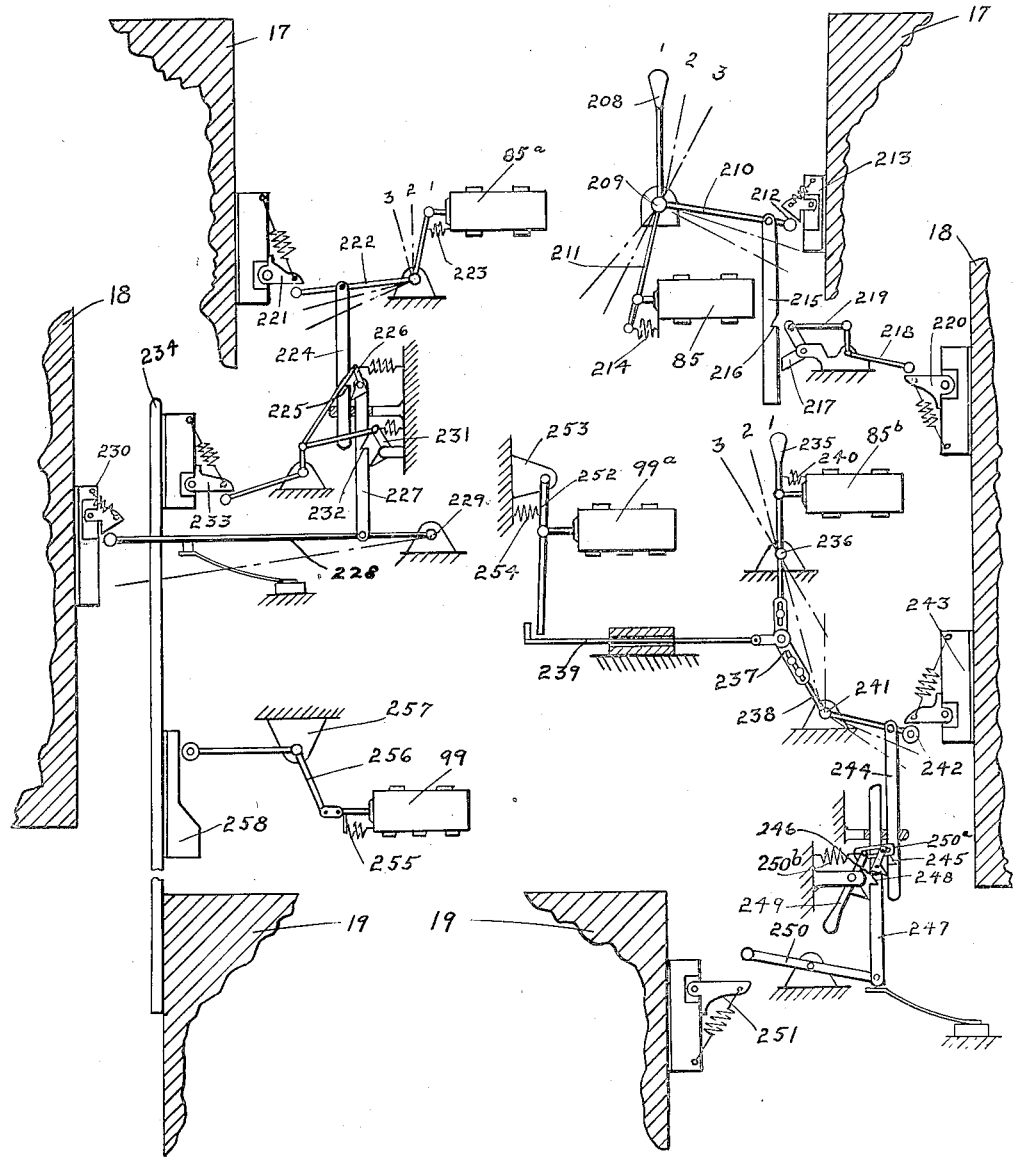
Figure 14 is a diagrammatic view showing the operating mechanism for the various pilot control valves.

Referring now to Figure 14, the connections by which the various pilot or control valves are operated in proper sequence are shown diagrammatically. A starting handle 208 is pivotally mounted in a bracket 209 and has rigidly secured thereto a pair of arms 210 and 211. The handle 208 and associated arms are movable between three positions indicated by the dot-dash lines. The arm 210 carries a roller 212 through which a vertically adjustable cam 213 mounted on the first blank holder 17 may actuate the handle 208 from position number 2 to position number 3, at any selected point in the downward movement of the blank holder. The arm 211 is connected to actuate the operating rod of the valve 85, a spring 214 normally holding the valve in right hand position. Depending from the arm 210 is a link 215 having a notch 216 which is engageable with the latch 217 when the handle 208 is moved from position number 2 to position number 3. The latch 217 is actuated through a bell crank 218 and link 219 by a vertically adjustable trip 220 mounted upon the auxiliary blank holder 18. The trip 220 is constructed to pass the bell crank 218 without actuating the same on the downward movement, while upon upward movement of the blank holder 18, the bell crank is actuated to trip the latch 217 and permit the valve 85 and associated mechanism to move to position number 1 under the urge of spring 214. The first blank holder 17 also carries a vertically adjustable trip 221 which is adapted to actuate at a predetermined point in the downward movement of the blank holder a bell crank 222 from position number 1 to position number 2. Bell crank 222 is connected to the operating rod of the valve 85a and is normally held in position number 1 by a spring 223. A link 224 depending from the bell crank 222 has a notch 225 which may be engaged by a latch 226. The latch 226 is carried upon a link 227 which in turn is mounted on a lever 228 pivoted at 229. When the bell crank 222 is moved from position number 1 to position number 2 by the trip 221, the latch 226 engages the notch 225 and connects the links 224 and 227 together. The arm 228 is adapted to be depressed by an adjustable cam 230 mounted on the auxiliary blank holder 18 whereby the links 224 and 227 may be actuated downwardly to move valve 85a from position number 2 to position number 3 where it is adapted to be latched by a latch 231 engaging in a notch 232 in the link 227. The latches 226 and 231 are releasable by an adjustable trip 233 mounted upon an extension 234 of the table 19.

The valve 85b has its operating rod connected to a lever 235 pivoted at 236 and connected by means of a link 237 to a bell crank 238 and a slide 239. A spring 240 normally maintains the valve 85b and associated mechanism in position number 1. The bell crank 238 is pivoted at 241 and carries a roller 242 engageable with an adjustable trip 243 mounted on the auxiliary blank holder 18 for actuation of the valve 85b from position number 1 to position number 2 at a predetermined point in the downward movement of the auxiliary blank holder 18. The bell crank 238 also carries a depending link 244 having a notch 245 engageable with a latch 246 when in position number 2. The latch 246 is carried by a second link 247 having a notch 248 engageable with a latch 249 when in position number 3. The latches 246 and 249 are connected by a slotted link 250a by which a spring 250b may urge latch 246 into the notch 245. The latch 249 is biased by its own weight toward the notch 248 and is movable clockwise sufficiently for the upper end thereof to abut the upper end of latch 246 so that both may be released together. The valve 85b is movable from position number 2 to position number 3 through the links 244 and 247 by a lever 256 which is engageable with the vertically adjustable trip 251 mounted upon the table 19.

The valve 99a is actuated by the slide 239 through the medium of a lever 252 pivoted in a bracket 253 and is normally held to the left by a spring 254. The slide 239 engages the lever 252 and moves the valve 99a to the right when lever 235 is moved from position number 2 to position number 3. The valve 99 is normally held to the right by a spring 255 and is actuatable to the left through the medium of a bell crank 256 pivoted in a bracket 257 and a vertically adjustable cam 258 carried by the extension 234 on the table 19. The cam 258 may be adjusted downwardly to such a position that it will not be operative upon the bell crank 256 if desired.

In operation of the mechanism heretofore described the various adjustable trips and cams associated with the blank holders 17 and 18 and the table 19 and which are illustrated in Figure 14 being adjusted to produce a desired cycle of operations and the press being fitted with suitable dies, the starting handle 208 is moved from position number 1 to position number 2. This movement operates valve 85 to the mid-position wherein ports 92, 86 and 89 thereof are placed in communication. Fluid from the intermediate pressure line 66 will then flow through the conduit 93, valve 85, conduits 90 and 97 to the cylinders 91 and 88 respectively. The application of fluid under pressure to both cylinders 88 and 91 simultaneously, places the valve 59 in the mid-position wherein the ports 64 and 58 are in communication with the port 67. Fluid from the intermediate pressure line 66 is thus permitted to flow through the conduits 60 and 57 to the return cylinder 44 and the operating cylinder 42. Check valve 62 is maintained open at this time since the valve 99 is maintained in the right hand position by the spring 255. Due to the larger area of the ram 41, the first blank holder 17 advances downwardly at a rapid rate and at a low pressure. As soon as the adjustable cam 213 comes in contact with the roller 212 the valve 85 is moved from position number 2 to position number 3 for transfer of the blank holder 17 from low pressure advance operation to high pressure advance.

The movement of valve 85 to the left hand position, that is position number 3, establishes communication between the ports 92 and 89 and also between the ports 94 and 86. Intermediate pressure fluid from the line 66 is thus permitted to flow to the cylinder 91 while the cylinder 88 is exhausted through the line 87, valve 85 and line 95 to the tank. Valve 59 is thus moved to the right hand position and high pressure fluid is permitted to flow from the line 66 through valve 59 and line 57 to the operating cylinder 42. The fluid exhausted from the return cylinder 44 flows through line 60, valve 59, to the intermediate pressure line 68. The blank holder 17 thus advances downwardly under high pressure to the end of its stroke. At a predetermined point in the movement of the blank holder 17 which may be either before or after the change from low pressure advance to high pressure advance, the trip 221 engages the bell crank 222 and moves the valve 85a from the right hand position to the mid-position; that is, from position number 1 to position number 2. The auxiliary blank holder 18 is thereupon caused to advance at a rapid rate under low effective pressure in the same manner that blank holder holder 17 was operated when valve 85 was placed in position number 2. Upon a predetermined downwardly advance of the blank holder 18, the cam 230 engages the lever 228 to move valve 85a from position number 2 to position number 3, thus transferring the second blank holder from low pressure advance to high pressure advance in a manner analogous to that previously described. The valve 85a is maintained in position number 3 by the latch 231. At a predetermined point in the downward movement of the blank holder 18, the trip 243 engages the roller 242 to move valve 85b from position number 1 to position number 2, thus initiating low pressure advance upwardly of the table 19, the sequence of operation of the valves 85b and 59b being similar to that of the valves 85 and 59 previously described.

Upon a predetermined upward advance of the table 19 the trip 251 actuates the lever 256 to pull the valve 85b from position number 2 to position number 3, thus changing from low pressure advance to high pressure advance of the table 19. At the completion of its stroke the effective half of the operating cycle is completed and the two blank holders and table stall against one another with the work between the dies.

The return cycle is initiated by manually or otherwise releasing the latches 246 and 249 by moving the latter clockwise which permits the valve 85b to move from position number 3 to position number 1 under the influence of spring 249. Fluid from the intermediate pressure line 68 is thus permitted to pass through the line 93b to line 87b and cylinder 88b, while the cylinder 91b is exhausted to the tank through line 90b, port 89b and port 94b. The hydraulic bias of the valve 59b thus causes it to move to the left hand position wherein ports 65b and 64b are connected and ports 67b and 58b are connected, thus admitting high pressure fluid from the line 66 to the line 60b and the return cylinder 56. After the table 19 has returned a predetermined amount, trip 233 actuates the latch 231 to permit valve 85a to move to position number 1 under the influence of spring 223. The auxiliary blank holder 18 is thus started on its return stroke in a manner similar to that previously described in connection with the table 19. At a predetermined point in the upward return of the blank holder, the trip 220 releases the latch 217 permitting the valve 85 to return to position number 1 under the influence of spring 214 and the blank holder 17 is thus started on its return stroke. Upon completion of the return strokes the three elements of the press become stalled against suitable stops and are maintained in this position by the pressure in the return cylinders until the handle 208 is again actuated to initiate a cycle of operation.

The valve 99a is operated when valve 85b moves from position number 2 to position number 3 by slide 239. The valve 99a then moves from the left hand position to the right hand position simultaneously with the movement of valve 85b from position number 2 to position number 3. High pressure fluid is thus admitted from the line 66 through line 108a through the ports 107a and 112a and line 105a to the cylinder 100a. The check valve 62a is thus closed to prevent the admission of intermediate pressure fluid through the line 60b to the return cylinders 56. The valve 99a simultaneously opens communication between the cylinders 56 and the tank through the line 60b, line 102a, check valve 104a, ports 106a and 109a and line 111a. On the high pressure advance of the table 19 the full effort of the rams 53 is then utilized without diminution by any counter-effort of the return pistons 55.

When it is desired to perform what is known as a wiping operation, the cam 258 is adjusted to a position such that the bell crank 256 will be actuated at a point in the upward movement of the table 19 which is prior to the completion of its stroke but subsequent to the completion of the stroke of the first blank holder 17. With the cam 258 thus adjusted, the valve 99 is actuated from right hand position to left hand position after the blank holder 17 has completed its stroke and communication is thus established from the high pressure line 66 through line 108, port 107, port 106, line 105, check valve 104, and line 60, to the return cylinder 44. This path is restricted in comparison to the line 60 so that the fluid is admitted to the cylinder 54 in restricted quantities, just sufficient to "break" the toggle linkage for the blank holder 17, after which the blank holder 17 is returned by force transmitted from the table 19 to the blank holder 17 through the dies and the work. Upon completion of the advance stroke of the table 19, the blank holder 17 continues to advance at a low rate from the pressure fluid supplied through the line 105 until the cam 258 drops to the point where bell crank 256 may move valve 99 to the right hand position under the influence of spring 255.

It will be understood that the settings of the various cams and trips may be changed to produce a wide variety of cycles of operation of the press as a whole and that a suitable adjustment will be selected for any stamping operation which it is desired to perform in the press. At all times when the press is in operation the pressure in the line 66 is maintained substantially constant by the control devices which appear in Figure 1a. Although the variable displacement pumps 71 and 71a together do not provide a sufficient volume of fluid to take care of the peak requirements of the press, the accumulator system A stores a sufficient volume of fluid at the operating pressure to supply the deficiency during peak requirements, and absorbs the excess fluid for storage during periods when the fluid requirements are low. The control of the pumps 71 and 71a is under the influence of the volume of fluid stored in the accumulator system A. Thus, when the cylinder 189 is filled with fluid and as a consequence has moved upwardly into the air chamber 75, the stop 200 engages the bell crank 201 to move the valve 134 from the right hand position to the left hand position. The ports 133 and 133a are placed in communication wtih the ports 137 and 135 respectively in the left position of valve 134. Fluid is thus admitted from the intermediate pressure line 81b to the line 136, valve 134, line 132a, and cylinder 127, thus actuating the piston 129, and the tilting box stub shaft 120, to the position of zero stroke. At the same time the cylinders 126 and 141 are exhausted to the tank through lines 132b and 132, valve 134 and line 138. By-pass valve 146 is then permitted to move upwardly in Figure 5 under its hydraulic bias to connect the ports 149 and 150, and thus shunt the outlet 69 and the inlet 78 of the pump. Similar action takes place upon the corresponding mechanism of the pump 71a.

Whenever the fluid stored in the cylinder 189 is depleted, the stop 199 moves the valve 134 to the right hand position in which the connections are reversed, and fluid under pressure is admitted to line 132 and cylinder 126 to move the tilting box to full stroke position and through line 132b to the cylinder 141 to move the by-pass valve 146 to closed position.

The intermediate pressure accumulators B and C are similar to the accumulator system A except no provision for actuating a valve analogous to the valve 134 is made. These accumulators act to provide a reservoir of intermediate pressure fluid to take care of peak demands upon the system made by the principal actuating cylinders of the press as well as the control system.

It will thus be seen that the present invention provides a hydraulic operating system for a multiple action press wherein the advantages of hydraulic operation may be obtained in presses of very large size without necessitating unreasonable size and excessive cost in the fluid pumps required for the supply of pressure fluid to the press.

While the form of embodiment of the invention as herein disclosed, constitutes a preferred form, it is to be understood that other forms might be adopted, all coming within the scope of the claims which follow.

What is claimed is:

1. In a hydraulic power transmission circuit the combination of a variable displacement, unidirectional delivery, fluid pump, a prime mover for operating the pump, an intermittently operating hydraulic motor fed by the pump, an accumulator for storing variable amounts of fluid under pressure and means for controlling the displacement of the pump in response to variations in the amount of fluid stored in the accumulator, said means operating upon an increase in the quantity of fluid stored in the accumulator to decrease the pump displacement, and upon a decrease in the quantity of fluid stored in the accumulator to increase the pump displacement, and means energized concurrently with the displacement varying means for by-passing the pump when not operating at full displacement.

2. In a hydraulic power transmission the combination of a closed fluid circuit having a high pressure portion, an intermediate pressure portion and a low pressure portion, a first pumping means for transferring fluid from the low pressure portion to the intermediate pressure portion, a second pump for transferring fluid from the intermediate pressure portion to the high pressure portion, a fluid motor, means for selectively operating the motor at either of two different pressure differentials, and means for accumulating fluid under pressure delivered by each pumping means while the motor is operating on fluid delivered by the other pumping means.

3. In a hydraulic power transmission the combination of a closed fluid circuit having a high pressure portion, an intermediate pressure portion and a low pressure portion, a first pumping means for transferring fluid from the low pressure portion to the intermediate pressure portion, a second pump for transferring fluid from the intermediate pressure portion to the high pressure portion, a reversible fluid motor, means for selectively operating the motor in either direction and in one direction at either of two different pressure differentials, and means for accumulating fluid under pressure delivered by each pumping means while the motor is operating on fluid delivered by the other pumping means.

4. In a hydraulic power transmission the combination of a closed fluid circuit having a high pressure portion, an intermediate pressure portion and a low pressure portion, a first pump for transferring fluid from the low pressure portion to the intermediate pressure portion, a second pump for transferring fluid from the intermediate pressure portion to the high pressure portion, a first fluid motor, a second fluid motor, means for operating the first motor at one pressure differential, means responsive to a predetermined movement of the first motor for operating the first motor at a second pressure differential, and means responsive to a predetermined movement of the first motor for operating the second motor.

5. In a hydraulic power transmission the combination of a source of fluid under pressure, a fluid motor, means forming a comparatively unrestricted conduit between the source and the motor, means forming a restricted conduit between the source and the motor, a valve for controlling fluid flow in the first conduit, a second valve for controlling fluid flow in the second conduit, and a separate valve operating motor for one of the valves responsive to pressure admitted to one of the conduits by the other valve.

6. In a hydraulic power transmission the combination of a closed fluid circuit having a high pressure portion, an intermediate pressure portion and a low pressure portion, a first pumping means for transferring fluid from the low pressure portion to the intermediate pressure portion, a second pumping means for transferring fluid from the intermediate pressure portion to the high pressure portion, a fluid motor, means for selectively operating the motor at either of two different pressure differentials, and means for accumulating fluid under pressure delivered by the second pumping means while the fluid motor is operating from the first pumping means.

7. In a hydraulic power transmission the combination of a closed fluid circuit having a high pressure portion, an intermediate pressure portion and a low pressure portion, a first pumping means for transferring fluid from the low pressure portion to the intermediate pressure portion, a second pumping means for transferring fluid from the intermediate pressure portion to the high pressure portion, a reversible fluid motor, means for selectively operating the motor in either direction and in one direction at either of two different pressure differentials, and means for accumulating fluid under pressure delivered by the second pumping means while the fluid motor is operating from the first pumping means.

8. In a hydraulic power transmission the combination of a closed fluid circuit having a high pressure portion, an intermediate pressure portion and a low pressure portion, a first pumping means for transferring fluid from the low pressure portion to the intermediate pressure portion, a second pumping means for transferring fluid from the intermediate pressure portion to the high pressure portion, accumulator means for storing and releasing a substantial quantity of fluid in the intermediate pressure portion, accumulator means for storing and releasing a substantial quantity of fluid in the high pressure portion, and intermittently operating fluid motor means operable selectively from either the high pressure portion or the intermediate pressure portion and with a fluid consuming capacity substantially greater than the delivery capacity of either pumping means but no greater than the delivery capacity of the pumping means and associated accumulator means together.

9. In a hydraulic power transmission circuit the combination of a fluid pump, a prime mover for operating the pump, an intermittently operating hydraulic motor fed by the pump, and having interconnected oppositely acting expansible chambers of different displacements, accumulator means associated with both the inlet side and outlet side of the pump for storing variable quantities of fluid at different constant pressures, means for maintaining the inlet side of the pump above atmospheric pressure, and valve means between the accumulator means and the fluid motor operable selectively to either connect both chambers of the motor to the inlet side for rapid low pressure advance of the motor, or to connect the larger chamber to the outlet side and the smaller chamber to the inlet side for slower high pressure advance or to connect the smaller chamber to the outlet side and the larger chamber to the inlet side for rapid lower pressure return, the ratio of the larger chamber displacement to the smaller chamber displacement being less than the ratio of the outlet side pressure to the inlet side pressure.

10. In a hydraulic power transmission circuit the combination of a fluid pump, a prime mover for operating the pump, an intermittently operating hydraulic motor fed by the pump, and having interconnected oppositely acting expansible chambers of different displacements, accumulator means associated with both the inlet side and outlet side of the pump for storing variable quantities of fluid at different constant pressures, means for maintaining the inlet side of the pump above atmospheric pressure, and valve means between the accumulator means and the fluid motor operable selectively to either connect both chambers of the motor to the inlet side for rapid low pressure advance of the motor, or to connect the larger chamber to the outlet side and the smaller chamber to a point of lower pressure for slower high pressure advance or to connect the smaller chamber and larger chambers to points of respectively high and low pressures for rapid lower pressure return, the ratio of the larger chamber displacement to the smaller chamber displacement being less than the inverse ratio of their respective operating pressures during the return stroke.

11. In a hydraulic power transmission circuit the combination of a fluid pump, a prime mover for operating the pump, an intermittently operating hydraulic motor fed by the pump, and having interconnected oppositely acting expansible chambers of different displacements, accumulator means associated with both the inlet side and outlet side of the pump for storing variable quantities of fluid at different constant pressures, an expansion tank at atmospheric pressure, means for maintaining the inlet side of the pump above atmospheric pressure, by transferring fluid from the expansion tank to said inlet side, and valve means between the accumulator means and the fluid motor operable selectively to either connect both chambers of the motor to the inlet side for rapid low pressure advance of the motor, or to connect the larger chamber to the outlet side and the smaller chamber to said expansion tank for slower high pressure advance or to connect the smaller chamber to the outlet side and the larger chamber to the inlet side for rapid lower pressure return, the ratio of the larger chamber displacement to the smaller chamber displacement being less than the ratio of the outlet side pressure to the inlet side pressure.

12. In a hydraulic power transmission circuit the combination of a first fluid motor, a first reciprocating load device to be brought into and out of a working position by the first fluid motor, a second fluid motor, a second reciprocating load device to perform a working stroke in opposition to the first load device, means operatively connecting the second fluid motor to the second load device, a toggle linkage for operatively connecting the first fluid motor to the first load device and arranged to lock against back thrust on the load device when the first load device is in working position, means for supplying pressure fluid to the first motor for bringing the first load device into working position, means for supplying pressure fluid to the second motor for imparting a working stroke to the second load device to exert a thrust against the first load device, and adjustable means for rendering said toggle effective or ineffective to resist the thrust of said second load device.

13. In a hydraulic power transmission circuit the combination of a first fluid motor, a first reciprocating load device to be brought into and out of a working position by the first fluid motor, a second fluid motor, a second reciprocating load device to perform a working stroke in opposition to the first load device, means operatively connecting the second fluid motor to the second load device, a toggle linkage for operatively connecting the first fluid motor to the first load device and arranged to lock against back thrust on the load device when the first load device is in working position, means for supplying pressure fluid to the first motor for bringing the first load device into working position, means for supplying pressure fluid to the second motor for imparting a working stroke to the second load device to exert a thrust against the first load device, and adjustable means for causing said first motor to retract the toggle whereby the first load device may be made to either resist the thrust of the second load device or to yield to the same.

14. In a hydraulic power transmission circuit the combination of a source of fluid under pressure, a member reciprocable between three fixed positions, a first fluid motor for moving the member from one extreme position to the other extreme position, a second fluid motor for moving the member from the other extreme position to mid position, and having a larger effective area than the first motor, means biasing the member to the first extreme position, and means for controlling the admission of fluid from said source to said motors and operable to disconnect both motors from said source whereby the member remains in the first extreme position, to connect both motors to said source whereby the member is moved to mid position, and to connect only the first motor to said source whereby the member is moved to said other extreme position.

ARTHUR L. ELLIS.